United States Patent
Planche

(10) Patent No.: US 9,510,656 B2
(45) Date of Patent: *Dec. 6, 2016

(54) SWITCHABLE DÉCOR

(71) Applicant: Swaponz, Inc., Natick, MA (US)

(72) Inventor: Patrick Planche, Natick, MA (US)

(73) Assignee: SWAPONZ, INC., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/920,198

(22) Filed: Oct. 22, 2015

(65) Prior Publication Data

US 2016/0081447 A1    Mar. 24, 2016

Related U.S. Application Data

(63) Continuation of application No. 13/832,903, filed on Mar. 15, 2013, now Pat. No. 9,199,432.

(51) Int. Cl.
*A45C 11/00* (2006.01)
*B32B 7/06* (2006.01)
(Continued)

(52) U.S. Cl.
CPC ........... *A45C 11/00* (2013.01); *B29C 63/0013* (2013.01); *B32B 7/06* (2013.01); *B32B 7/12* (2013.01); *B44C 1/10* (2013.01); *C09J 7/00* (2013.01); *C09J 7/0207* (2013.01); *A45C 2011/002* (2013.01); *A45C 2011/003* (2013.01); *B29L 2031/3437* (2013.01); *B32B 2250/40* (2013.01); *B32B 2307/748* (2013.01);
(Continued)

(58) Field of Classification Search
CPC ............. B32B 7/06; B32B 7/12; B32B 37/12; B32B 2250/40; B32B 2405/00; B32B 2451/00; B32B 2307/748; B44C 1/105; B44C 1/18; B29C 63/0013; B29L 2031/3437; Y10T 428/1486; C09J 7/00
See application file for complete search history.

(56) References Cited

U.S. PATENT DOCUMENTS 5,248,536 A    9/1993    Du Katz
5,458,930 A    10/1995    Brown
(Continued)

FOREIGN PATENT DOCUMENTS

CN    203492984    3/2014
WO    98/17088    4/2008

OTHER PUBLICATIONS

English Translation of Notification of the First Office Action for corresponding Chinese Utility Model Patent Application No. 201490000513.6 issued on Jun. 13, 2016.

*Primary Examiner* — Patricia L Nordmeyer
(74) *Attorney, Agent, or Firm* — Occhiuti & Rohlicek LLP

(57) ABSTRACT

An apparatus for decorating an article includes a decorative sheet member having a first side and a second side, neither of the first and second sides having an adhesive; a fixation sheet member having a third side configured to be attached to a surface of the article, the third side including a first adhesive with a first adhesion characteristic; and a fourth side, opposite the third side and configured to receive one of the first and second sides of the decorative sheet, the fourth side having a second adhesive with a second adhesion characteristic, the second adhesion characteristic being less permanent than the first adhesion characteristic.

16 Claims, 4 Drawing Sheets

(51) Int. Cl.
*B32B 7/12* (2006.01)
*B44C 1/10* (2006.01)
*B29C 63/00* (2006.01)
*C09J 7/00* (2006.01)
*C09J 7/02* (2006.01)
*B29L 31/34* (2006.01)

(52) U.S. Cl.
CPC ....... *B32B 2405/00* (2013.01); *B32B 2439/00* (2013.01); *B32B 2451/00* (2013.01); *C09J 2205/11* (2013.01); *Y10T 428/1486* (2015.01)

(56) References Cited

U.S. PATENT DOCUMENTS

| | | | |
|---|---|---|---|
| 5,620,764 A * | 4/1997 | Schwarz | ................ B44C 1/105 428/187 |
| 6,482,288 B1 | 11/2002 | Kreckel | |
| 9,199,432 B2 * | 12/2015 | Planche | ................... B32B 7/06 |
| 2001/0006714 A1 | 7/2001 | Bull et al. | |
| 2002/0066527 A1 | 6/2002 | Lee | |
| 2002/0090509 A1 | 7/2002 | Hsu et al. | |
| 2005/0279817 A1 | 12/2005 | Susan | |
| 2010/0288405 A1 | 11/2010 | Hsu | |
| 2011/0192857 A1 | 8/2011 | Rothbaum et al. | |
| 2011/0244230 A1 | 10/2011 | Tsubaki et al. | |
| 2012/0275130 A1 | 11/2012 | Hsu et al. | |
| 2013/0316115 A1 | 11/2013 | Smith et al. | |
| 2014/0272233 A1 | 9/2014 | Downs | |
| 2015/0111623 A1 | 4/2015 | Hegemier et al. | |

* cited by examiner

SWITCHABLE DÉCOR

CROSS REFERENCE TO RELATED APPLICATION

This application is a continuation of U.S. application Ser. No. 13/832,903, filed on Mar. 15, 2013 and issued as U.S. Pat. No. 9,199,432 on Dec. 1, 2015, the contents of which are hereby incorporated by reference in their entirety.

BACKGROUND

This invention relates to covers that are attached to devices, for example, to protect or decorate devices, such as portable electronic devices.

Many consumer products, particularly portable devices or equipment, are desirably customized to allow the owner to more easily distinguish their device from other devices thereby facilitating identification of his/her device. For example, a wide variety of cases and "skins" (i.e., thin sticker with adhesive) are available for covering cell phones, smartphones, laptop computers and tablet computers. These cases also allow owners to personalize their equipment and express themselves.

When the cover becomes worn or when the owner of the device grows tired of the image or graphical design on the device, the cover is replaced or in the case of a skin, stripped from the housing of the device.

SUMMARY

In a general aspect of the invention, an apparatus for decorating an article includes a decorative sheet member having a first side and a second side, neither of the first and second sides having an adhesive; a fixation sheet member having a third side configured to be attached to a surface of the article, the third side including a first adhesive with a first adhesion characteristic; and a fourth side, opposite the third side and configured to receive one of the first and second sides of the decorative sheet, the fourth side having a second adhesive with a second adhesion characteristic, the second adhesion characteristic being less permanent than the first adhesion characteristic.

In another general aspect of the invention, a method for providing an apparatus for decorating an article comprises the steps of providing a decorative sheet member having a first side and a second side, neither of the first and second sides having an adhesive; providing a fixation sheet member having a third side configured to be attached to a surface of the article and a fourth side opposite the third side, the fourth side configured to receive one of the first and second sides of the decorative sheet, providing a first adhesive with a first adhesion characteristic on the third side; providing a second adhesive with a second adhesion characteristic on the fourth side, the second adhesion characteristic being less permanent than the first adhesion characteristic; attaching the third side of the fixation sheet to the article; and attaching the fourth side of the fixation sheet to either of the first side and second side of the decorative sheet member.

Embodiments of these aspects of the invention may include one or more of the following features. The first adhesive is a permanent adhesive and the second adhesive is a non-permanent adhesive. The decorative sheet has a predetermined dimension that is commensurate in size with a predetermined dimension of the fixation sheet. The decorative sheet is formed of a first material, the fixation sheet is formed of a second material and the non-permanent adhesive adheres more strongly to the second material than to the first material For example, the decorative sheet may have a thickness in a range between 6 mil (0.006 inch) and 30 mil (0.030 inch). The first side of the decorative sheet may include a photographic, graphical or textual image. The second adhesive of the fourth side may be a pressure-sensitive adhesive. The pressure-sensitive adhesive may include microspheres. The fourth side of the fixation sheet may have a first region including the second adhesive and a second region that does not include the second adhesive. The second region may have a first predetermined shape.

In certain embodiments, the article is in the form of a case, for example, configured to receive a portable communications device, such as a phone, PDA, notebook, MP3 player or laptop computer. In other embodiments, the case is in the form of a luggage tag, frame, book, light switch plate, or insert spot in an auto dashboard or other such case which has a surface suitable for receiving such a decoration.

The case can include a framing member extending around at least a portion of the periphery of the case, the framing member having a height substantially the same as or greater than the combined thickness of the fixation sheet member and the decorative sheet member.

The apparatus can further include a removal device (e.g., a suction device) configured to separate the decorative sheet from the fixation sheet. The suction device has a suction area substantially the same as the second region of the fourth side of the fixation sheet. The suction device may have a loop member configured for convenient attachment to a keychain, backpack, trouser loop or other convenient spot.

In a particular embodiment, the apparatus does not have a case and the fixation sheet is applied directly to an outer surface of the article (e.g., a portable communications device, such as a phone, PDA, notebook, MP3 player, laptop computer, a luggage tag, frame, book, light switch plate, or insert spot in an auto dashboard or other articles having a surface suitable for receiving such a decoration).

In another aspect of the invention, an apparatus comprises an article having an outer surface including a non-permanent adhesive; and a decorative sheet member having a first side and a second side, neither of the first and second sides having an adhesive.

In embodiments of this aspect of the invention, the decorative sheet is sized and configured to substantially cover the outer surface of the article. The decorative sheet is formed of a first material, the outer surface of the article is formed of a second material and the non-permanent adhesive adheres more strongly to the second material than to the first material. The article may be a portable communications device, such as a phone, PDA, notebook, MP3 player or laptop computer. In other embodiments, the article is a luggage tag, frame, book, light switch plate, or insert spot in an auto dashboard or other such case which has a surface suitable for receiving such a decoration.

Among other advantages, the fixation sheet has a first adhesive that firmly secures the fixation sheet to the article and a second adhesive, less permanent than the first adhesive, to allow the user to change the decorative sheet (e.g., switchable décor). Because second adhesive is less permanent than the first adhesive and the fixation sheet includes the adhesive and not the decorative sheet, the decorative sheet can be reused, easily stored, easily applied and switched for a different decorative sheet. The system provides a simple and fun way to decorate, change and personalize the look of the article. The look of the article can be changed without having to replace the entire case or the decal or skin that has adhesive applied directly to it.

Other features and advantages of the invention are apparent from the following description, and from the claims.

DESCRIPTION

Figure 1:
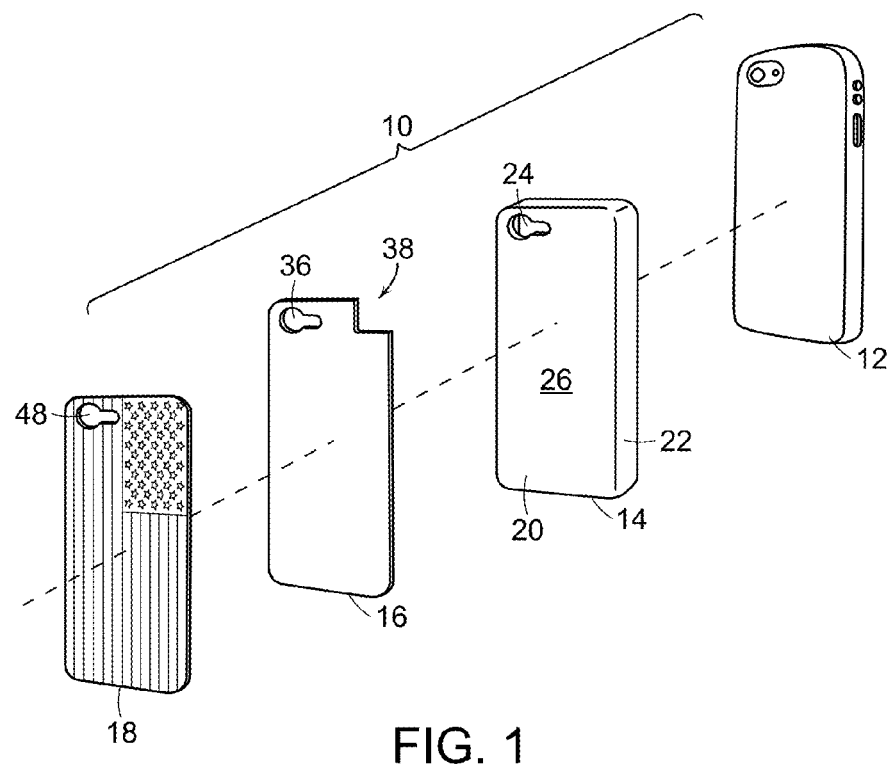
FIG. 1 is an exploded perspective view of a switchable décor used in conjunction with a smartphone.

Referring to FIG. 1, a system 10 for protecting and decorating a smartphone 12 includes a protective case 14, a fixation sheet 16 and a decorative covering, referred to here as a switchable décor 18. Case 14 is formed of relatively rigid molded plastic and is sized to receive smartphone 12. In particular, case 14 includes a backwall 20 and four side walls 22 which in aggregate form a shell that essentially encloses cell phone 14. Side walls 22 may include openings or cutouts to allow access to switches and connections for charging, headphones, etc. on smartphone 12. Member 20 also includes an opening 24 so as not to block or conceal the camera lens of the smartphone 12. As will be described in greater detail below, case 14 is sized and shaped to receive switchable décor 18. Furthermore, case 14 includes a rear surface that opposes the outer surface of smartphone 12 and when attached to the smartphone forms a cavity 49 (FIG. 5) that is used to store additional decors 18.

Figure 2:
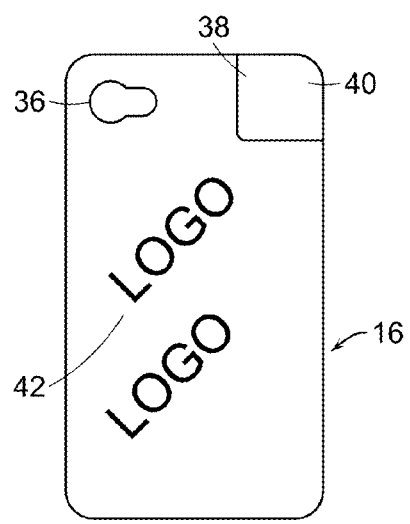
FIG. 2 is a plan view of the front face of the case of FIG. 1 including a fixation sheet.
Figure 3:
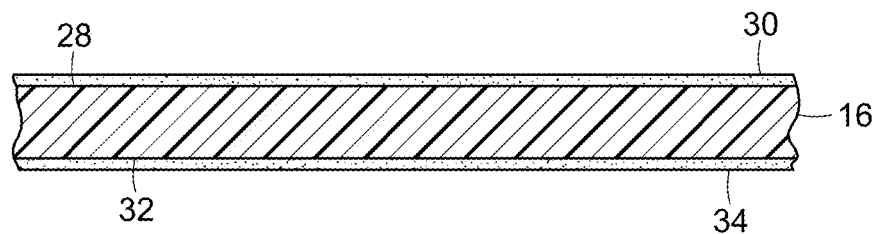
FIG. 3 is a cross-sectional view of the fixation sheet shown in FIG. 2.

Referring to FIGS. 2 and 3, system 10 includes a fixation sheet 16 formed of relatively thin (2-5 mils) plastic or paper and sized to attached to a front surface 26 of case 14. A rear surface 28 of fixation sheet 16 includes a relatively strong adhesive 30 so that when positioned on front surface 26 of case 14, fixation sheet is, for most practical circumstances, permanently affixed to case 14. One example of a suitable relatively permanent adhesive is Ref. No. 204, manufactured by Polykote Corporation, Easton, Pa.

On the other hand, fixation sheet 16 includes on a front surface 32 a non-permanent adhesive 34 that is less strong than adhesive 30 used on rear surface 28. Fixation sheet 16 also includes an opening 36 sized commensurately with opening 24 of case 14. For reasons that will be discussed in greater detail below in conjunction with FIG. 6, fixation sheet also includes a cutout 38 such that a portion 40 of front surface 26 of case 14 is exposed and not covered with an adhesive. In this embodiment, the cutout 38 is provided so that exposed portion 40 of case 14 is in a corner of the case.

In this embodiment, non-permanent adhesive 34 is a microsphere adhesive composed of tiny spheres. The tiny spheres measure 10 to 250 microns in diameter and form a discontinuous film to limit the amount of surface area contact between the adhesive and front surface 32 of fixation sheet 16. One example of a suitable non-permanent adhesive is Ref. No. PS822, manufactured by Polykote Corporation, Easton, Pa.

Switchable décor 18 is formed of plastic and sized commensurately with fixation sheet 16. The thickness of switchable décor 18 is generally between 6 mil (.006 inch) and 30 mil (0.030 inch), preferably 12-17 mil. Décor 18 also includes an opening 48 sized commensurately with openings 24, 36 of fixation sheet 16 and case 14, respectively. Unlike fixation sheet 16, switchable décor does not include an adhesive. Rather, switchable décor is securely attached to case 14 by non-permanent adhesive 34 on fixation sheet 16.

The adhesive characteristic or "stickiness" of non-permanent adhesive 34 is dependent on the materials it contacts. That is, non-permanent adhesive 34 may have a stronger adherence to one material than a different material. Therefore, depending on the particular non-permanent adhesive that is being used, the particular materials selected for making fixation sheet 16 and switchable décor 18 are generally selected such that the non-permanent adhesive will adhere more strongly to fixation sheet 16 and will adhere less to switchable décor 18. By selecting the appropriate non-permanent adhesive in conjunction with the materials for fixation sheet 16 and switchable décor 18, the switchable décor is more easily separated from fixation sheet 16 and the non-permanent adhesive more securely retained on the fixation sheet.

Switchable décor 18 includes a graphical image or design having black and white, color, text, names, patterns, images, photographs, or combinations of such designs. For example, the designs can include names, logos, slogans, advertisements or combinations of such graphical indicia. The designs may be customized by the user or be provided by the manufacturer of system 10. The design can be provided onto the substrate supporting the design by printing, silk screening, etching, etc. In certain embodiments. Switchable décor may have a luminescent effect (i.e., glow-in-the-dark), for example, as described in U.S. Pat. No. 6,875,525, which is incorporated in its entirety by reference.

Figure 4:
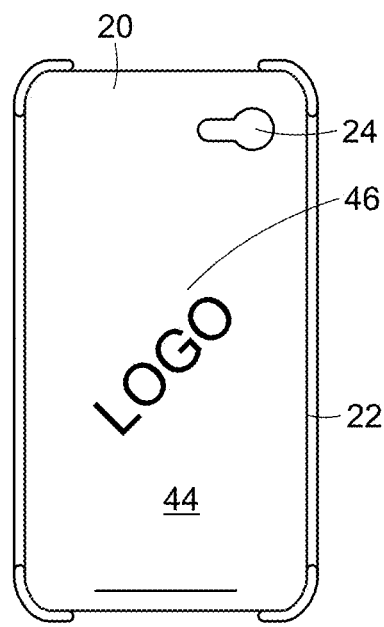
FIG. 4 is a plan view of the rear side of the case.

In this embodiment, fixation sheet 16 includes a graphic 42 (e.g., a corporate logo). Similarly, as shown in FIG. 4, a rear surface 44 of case 14 may also include a graphic 46 that is printed, embossed or etched thereon.

Figure 5:
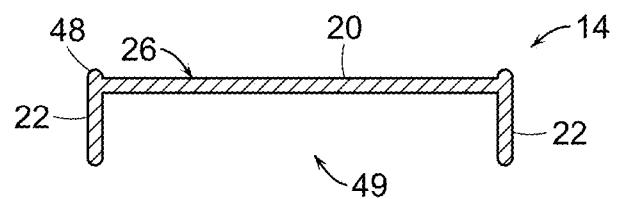
FIG. 5 is a cross-sectional end view along lines 3-3 of FIG. 4.

Referring to FIG. 5, front surface 26 of case 14 includes a lip or ridge 48 that extends around the periphery of backwall 20. Ridge 48 has a height the same or slightly larger than the combined thickness of décor 18 and fixture sheet 16 so that once attached to fixture sheet 16 the edge of switchable décor 18 is protected. In this way, the likelihood that the switchable décor 18 is inadvertently removed is minimized.

In using system 10, the user carefully attaches rear surface 28 of fixation sheet 16 to front surface 26 of case 14 such that non-permanent adhesive 34 on front surface 32 of the fixation sheet is exposed. The user can then attach switchable décor 18 to the non-permanent adhesive on the front surface 32 of fixation sheet 16. Once in place, switchable décor 18 is firmly secured to case 14.

Over time, the graphical image on switchable décor 18 may become worn or the user may desire replacing the décor for a different one. To do so, the user can remove the switchable décor 18 that is on case 14 and replace it with a different switchable décor (e.g., one that may be stored between smartphone 12 and case 14). Because the switchable decors do not include adhesive, they are easily exchanged and stored.

Figure 6:
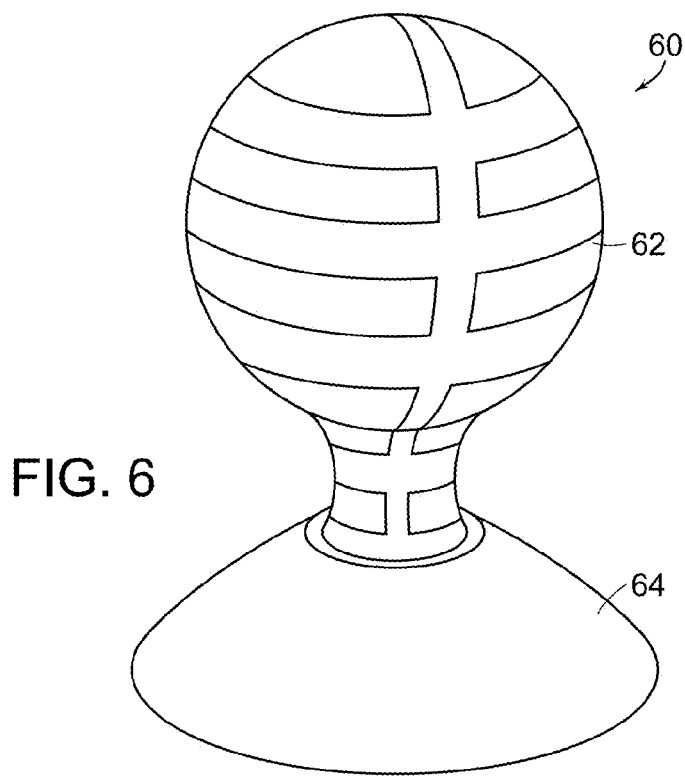
FIG. 6 is a perspective view of a suction tool for use in removing the switchable décor from the case.

Referring to FIG. 6, a suction tool 60 can be used to facilitate removal of switchable décor 18 from fixation sheet 16. In particular, the suction tool 60 includes a handle 62 attached to a suction cup 64 sized consistent with the size of cutout 38 of fixation sheet 16. Because there is no adhesive associated with cutout 38, the user applies suction cup 64 over and to that portion of switchable décor 18 over the cutout 38 of fixation sheet 16.

Figure 7:
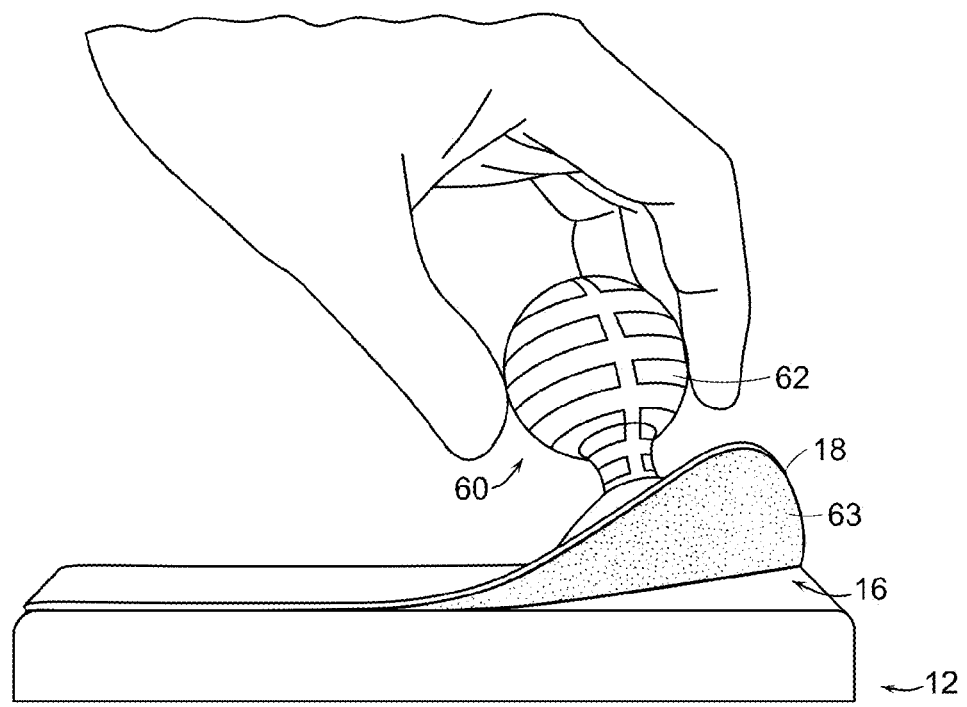
FIG. 7 illustrates the use of the suction tool of FIG. 6 in removing the switchable décor from the case.
Figure 8:
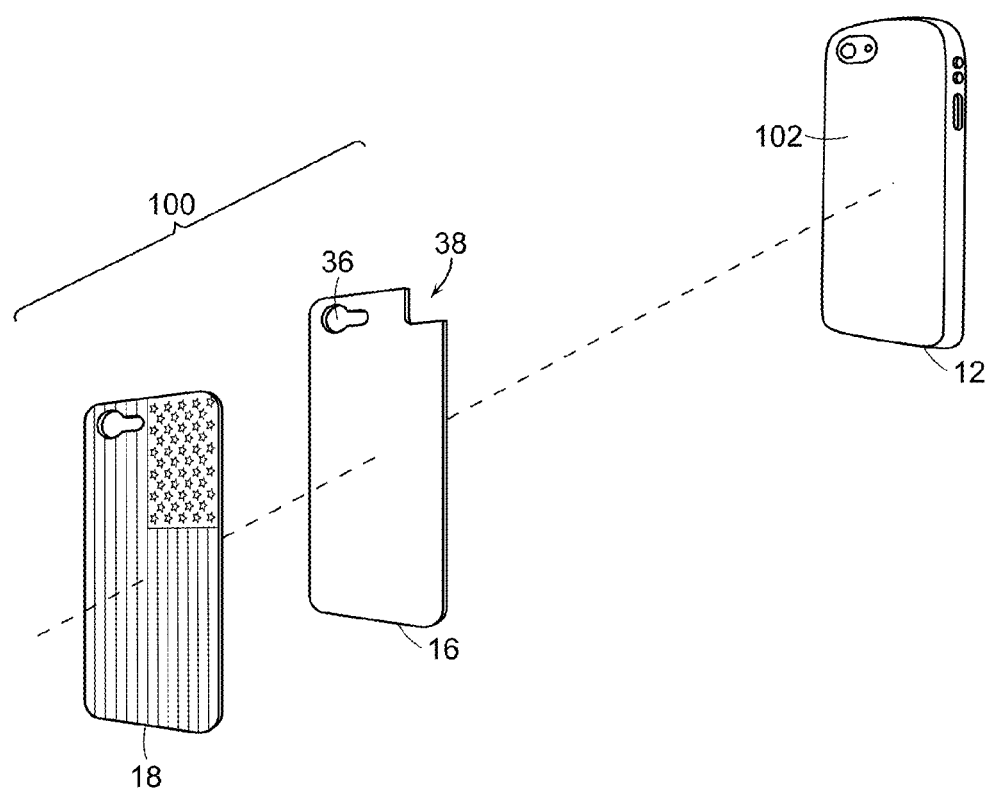
FIG. 8 is an alternative embodiment of a system having a switchable décor used in conjunction with a smartphone.

Referring to FIG. 7, once suction tool 60 is attached to switchable décor 18 the user can pull on handle 62 to lift the edge of the décor. With an edge 63 of switchable décor 18 lifted, the user can grasp the switchable décor 18 and peel it from the fixation sheet having non-permanent adhesive 34.

In another embodiment, the case 14 may be eliminated and the fixation sheet 16 applied to directly to an outer surface of the article. For example, referring to FIG. 7, a system 100 includes fixation sheet 16 which is applied directly to an outer rear surface 102 of smartphone 12 as well as switchable décor 18. Switchable décor is attached and removed from fixation sheet 16 in the same manner described above in conjunction with FIGS. 1-6.

In still another embodiment, the fixation sheet 16 is eliminated and non-permanent adhesive 34 is applied directly to the outer surface of the case 14 or to any article including the smartphone 12 without a case. In this way, switchable décor 18 is attached directly to the case or the article. For example, the non-permanent adhesive can be applied directly to the outer rear surface by the manufacturer of the case and covered by a temporary sheet or switchable décor. In that case, the manufacturer would select an appropriate non-permanent adhesive that is suitable for use with the material of the case. For example, as described above, the material used to form case 14 and the particular non-permanent adhesive 34 are selected such that the adhesive adheres more strongly to the material of the case and adheres less strongly to the flexible décor.

It is to be understood that the foregoing description is intended to illustrate and not to limit the scope of the invention, which is defined by the scope of the appended claims.

For example, although non-permanent adhesive 34 is described as being in the form of microspheres, other non-permanent adhesives can be used. Other examples of non-permanent adhesives include removable pressure sensitive adhesives as well as repositionable adhesives. Furthermore, other non-adhesive mechanisms (e.g., magnetic or static) can be substituted for non-permanent adhesive 34.

Also, although a system 10 including a fixation sheet and switchable décor was described above in conjunction with a smartphone it is appreciated that the system can be used with a wide variety of other articles including portable electronic devices (cell phones, laptop computers, tablets, MP3 players and similar devices) as well as other articles such as a luggage tag, light switch plate, frames, books or insert spot in an auto dashboard or the like.

Other embodiments are within the scope of the following claims.

What is claimed is:

1. An apparatus comprising:
   a case for receiving a removable article, the case having an outer surface;
   a decorative sheet member having:
      a first side and a second side, neither of the first and second sides having an adhesive;
   a fixation sheet member having:
      a third side configured to be attached to the outer surface of the case, the third side including a permanent adhesive with a first adhesion characteristic; and
      a fourth side, opposite the third side and configured to receive one of the first and second sides of the decorative sheet, the fourth side having a repositionable non-adhesive material with a second adhesion characteristic, the second adhesion characteristic being less permanent than the first adhesion characteristic.

2. The apparatus of claim 1 wherein the decorative sheet and the fixation sheet are configured such that when the decorative sheet is removed from the fourth side of the fixation sheet, the repositionable non-adhesive material remains on the fourth side of the fixation sheet.

3. The apparatus of claim 1 wherein the decorative sheet is formed of a first material, the fixation sheet is formed of a second material and the repositionable non-adhesive material adheres more strongly to the second material than to the first material.

4. The apparatus of claim 1 wherein the decorative sheet has a predetermined dimension that is commensurate in size with a predetermined dimension of the fixation sheet.

5. The apparatus of claim 1 wherein the decorative sheet has a thickness a range between 6 mil (0.006 inch) and 30 mil (0.030 inch).

6. The apparatus of claim 1 wherein the first side of the decorative sheet includes a photographic, graphical or textual image.

7. The apparatus of claim 1 wherein the repositionable non-adhesive material comprises a static material.

8. The apparatus of claim 1 wherein the fourth side has a first region including the repositionable non-adhesive material and a second region that does not include the repositionable non-adhesive material.

9. The apparatus of claim 8 wherein the second region has a first predetermined shape.

10. The apparatus of claim 1 wherein the case is configured to receive a portable communications device.

11. The apparatus of claim 10 wherein the portable communications device is a phone, PDA, notebook, MP3 player or laptop computer.

12. The apparatus of claim 1 wherein the case is in the form of a luggage tag, frame, book, light switch plate, or insert spot in an auto dashboard or other such case which has a surface suitable for receiving such a decoration.

13. The apparatus of claim 1 wherein the case includes a framing member extending around at least a portion of the periphery of the case, the framing member having a height substantially the same as a combined thickness of the fixation sheet member and the decorative sheet member.

14. The apparatus of claim 1 wherein the decorative sheet is sized and configured to substantially cover the outer surface of the article.

15. The apparatus of claim 1 wherein the decorative sheet is formed of plastic.

16. The apparatus of claim 1 wherein the case includes a backwall and a plurality of side walls which in aggregate form a cavity.

* * * * *